United States Patent [19]

Jacobson

[11] Patent Number: 4,741,632
[45] Date of Patent: May 3, 1988

[54] CONSTANT TORQUE BALL BEARING

[75] Inventor: Peter E. Jacobson, Phoenix, Ariz.

[73] Assignee: Honeywell Inc., Minneapolis, Minn.

[21] Appl. No.: 847,077

[22] Filed: Apr. 1, 1986

[51] Int. Cl.$^4$ .................. F16C 33/32; F16C 33/38; F16C 33/34; F16C 33/52

[52] U.S. Cl. ...................... 384/491; 384/450; 384/523; 384/533; 384/567; 384/568; 384/574

[58] Field of Search ............... 384/447, 450, 490–492, 384/495–498, 514, 523, 533, 565, 567, 568, 574

[56] References Cited

U.S. PATENT DOCUMENTS

| | | | |
|---|---|---|---|
| 3,020,106 | 2/1962 | Mims | 384/568 |
| 3,529,477 | 9/1970 | Quermann | 74/5 F |
| 3,620,585 | 11/1971 | Anderson et al. | 384/491 |
| 3,667,821 | 6/1972 | Rader | 384/574 |
| 3,813,135 | 5/1974 | Martinie | 384/491 |
| 3,918,778 | 11/1975 | Jacobson et al. | 384/447 |

FOREIGN PATENT DOCUMENTS 518583 6/1976 U.S.S.R. .................. 384/496

Primary Examiner—Stuart S. Levy
Assistant Examiner—Thomas R. Hannon
Attorney, Agent, or Firm—Arnold L. Albin

[57] ABSTRACT

A ball structure for stabilizing bearing torque in high speed, preloaded, angular contact load supporting ball bearings operating on elastohydrodynamic lubricant films. Angular momentum developed about a ball spin axis that is not parallel to the bearing rotation axis results in a continuous creep of the ball about the momentum axis, thereby allowing a long term preload and torque variation. The improved ball set is shaped so that each ball has a mass inertia about its desired spin axis that is greater than about all other axes, so as to develop a restoring moment tending to maintain rotation about a fixed axis in each ball. The ball cage is configured to maintain ball alignment during run-up and run-down of the bearing.

3 Claims, 3 Drawing Sheets

CONSTANT TORQUE BALL BEARING

BACKGROUND OF THE INVENTION

1. Field of the Invention

The present invention relates generally to the art of antifriction bearings and more particularly to the art of ball bearings. More specifically, the invention relates to preloaded, angular contact ball bearings for precision instruments such as the spin bearings of gyroscopic instruments, and to a ball and cage structure for stabilizing bearing torque and preload.

2. Description of the Prior Art

The accuracy and stability of a gyroscope, that is, its ability to maintain its spin axis fixed in inertial space, is dependent, among other factors, on the characteristics of the ball bearings which support the spinning rotor. It has been observed that spin ball bearings utilized in Reaction Wheel Assemblies (RWA's) and instrument gyros exhibit low level long term torque periodicity (on the order of 2 to 60 minutes). This torque variation is evidenced in very small but undesirable periodic wheel speed changes in the case of RWA's (resulting in spacecraft position changes) and drift variations in the case of gyros. The magnitude of these variations is very small, on the order of 5 percent or less of the mean torque at speeds to 6 KRPM.

While is is desired that all of the balls of a ball bearing set be identical in size and all perfectly spherical, it is recognized in the art that such perfection is normally unattainable. Also, those skilled in the art recognize that conventional ball cage designs leave much to be desired in terms of stability and mechanical as well as audible noise. Given these practical limitations, even the most carefully manufactured ball bearings will not provide ultimate antifriction support, particularly of the precision required for supporting a gyroscope rotor, since the slightest imperfection in the rotor shaft support bearings can result in a long term drift of the gyro. The foregoing variations in torque have been found to be due to gyroscopic precession of the individual balls of the ball set, resulting in variations in the ball diameter presented to the points of angular contact with the ball races and an associated variation in preload. There have been no known previous attempts to stabilize ball bearing torque by preventing ball precession. It is probable that the existence of this torque periodicity as well as the reason for it is not commonly known. For these reasons it is doubtful that prior related art exists.

It has been discovered by the present inventor that a major source of these variations has been traced to small preload variations and changing differential ball spin velocities caused by shifts of the balls' spin axes as the balls precess. This invention solves the problem of torque periodicity by preventing ball precession by combinations of mass inertia configuration control of the balls and mechanicl capture of the balls.

SUMMARY OF THE INVENTION

The constant torque ball bearing assembly of the present invention comprises an outer bearing ring having an outer bearing race and an inner bearing ring having an inner bearing race. The rings are spaced apart and concentrically disposed on a bearing axis. A plurality of balls are spaced apart and in essentially free rolling contact between the races. A spin axis is developed in each ball orthogonal to the points of contact with the inner and outer races at each ball. The balls are configured to provide a mass inertia about their respective spin axes that is greater than that about any other of their axes, and in operation results in inertial moments that resist any tendency of the balls to deviate from the desired spin axis.

In a further embodiment, the ball bearing is of the preloaded angular contact type having outer and inner bearing rings having corresponding races and concentric with respect to a common bearing axis. A plurality of balls in rolling contact with the races are preloaded along the bearing axis so that the line of contact between the balls and the races lies at an angle with respect to a plane normal to the bearing axis. In operation the balls are subjected to a gyroscopic moment which if of significant magnitude tends to precess the balls about an axis normal to both the line of contact of the ball and raceways and the rotation axis of the balls. The balls are configured to provide a non-uniform mass inertia distribution so that the potential precession induces a restoring inertial movement to stabilize the ball position and resultant bearing torque.

BRIEF DESCRIPTION OF THE DRAWINGS

Preferred embodiments of the present invention are described and illustrated in the attached drawings, wherein like numbers refer to like elements.

DESCRIPTION OF THE PREFERRED EMBODIMENTS

Figure 1:
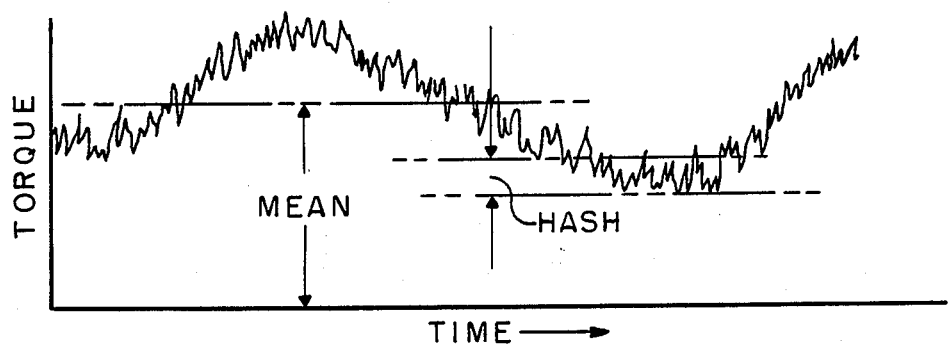
FIG. 1 is a curve representative of torque variations in a gyro ball bearing configuration as a function of time, showing an essentially sinusoidal long period distribution.

FIG. 1 illustrates graphically, and somewhat simplified, the torque characteristics of a typical conventional precision preloaded, angular contact elastohydrodynamic (EHD) lubricant supported spin bearing for a gyroscope of the type disclosed in the present assignee's U.S. Pat. Nos. 3,529,477 or 3,677,097 and embodying a conventional free floating ball cage. The gyro rotor may be spun at speeds of say 6,000 to 24,000 R.P.M. The short term variation in torque or hash is due primarily to dynamic interaction between the individual balls and their separating cage. Such dynamics result from somewhat spasmodic ball-cage contact, cage-race ring contact, etc. These short term variations in load torque may be eliminated or substantially eliminated by incorporating in the bearing the unique dynamically stabilized ball cage disclosed in the present inventor's U.S. Pat. No. 3,918,778 also assigned to the present assignee. However, substantial elimination of this most evident torque variation by introducing the dynamically stabilized ball cage made evident a subtle and very long term periodic torque variation as illustrated graphically by the sinusoidal variation in the aforesaid FIG. 1. It is to the practical elimination of this long term variation in torque, attributed to precession of the balls and resultant shift in their spin axes, that the present invention is directed.

Figure 2:
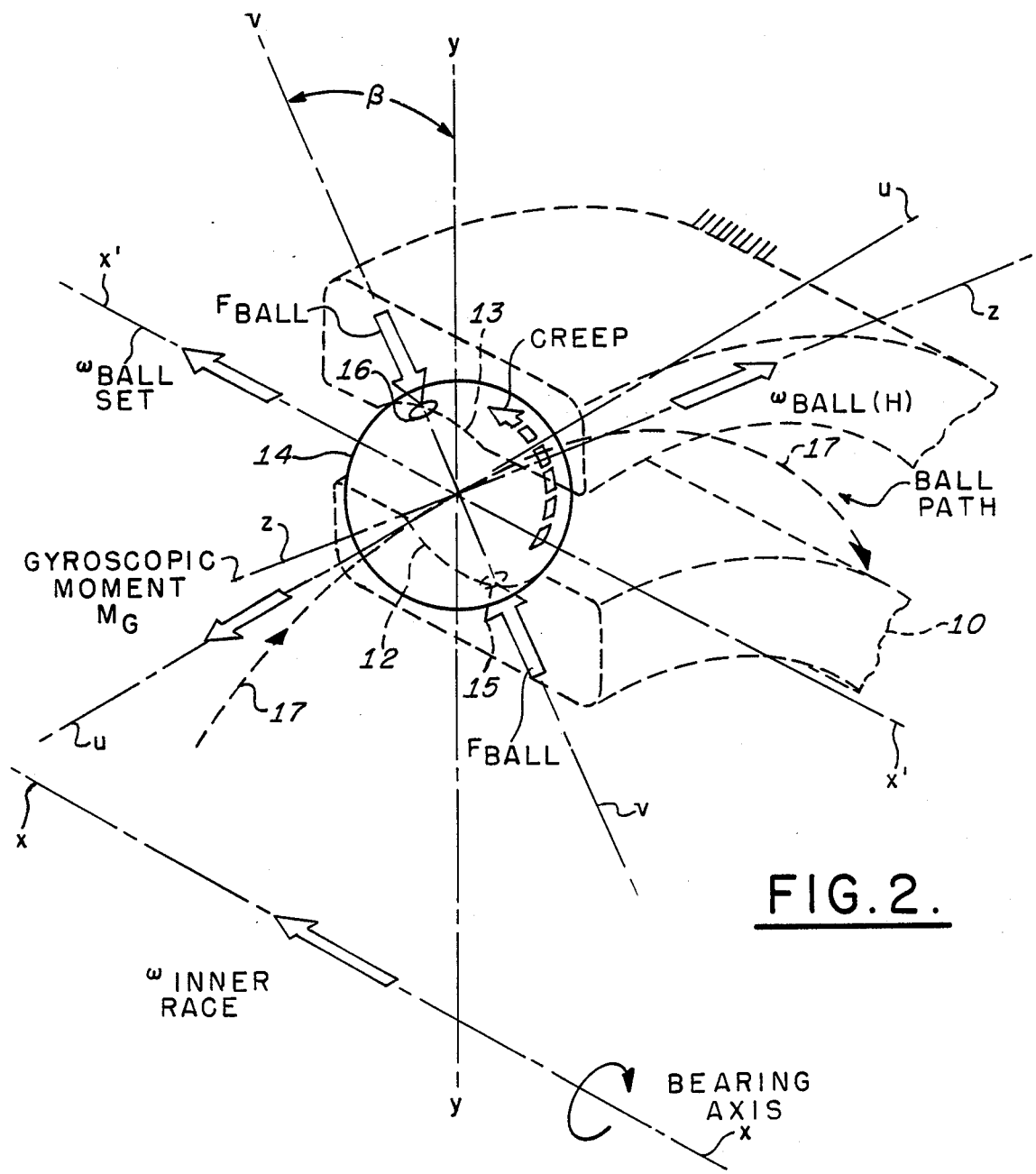
FIG. 2 is a schematic drawing of a single ball in a conventional multiple ball preloaded, angular contact ball bearing, illustrating the various parameters contributing to ball precession and resultant variable torque.

The invention may best be understood by analyzing the forces and moments acting on the ball complement. Referring now to FIG. 2, a conventional ball bearing assembly comprises relatively radially spaced concentric inner race ring 10 and outer race ring 11, illustrated in phantom, having raceways 12 and 13 respectively, between and in which are spaced by means of a ball separator (usually referred to as ball retainer or cage as will be discussed below, but not shown in FIG. 2 for clarity), a plurality of balls, sometimes referred to as the ball complement or ball set, only one of which is shown in FIG. 2. Each ball 14, ideally identical to each other in the complement and almost perfectly spherical, supports the load (not shown), herein assumed to be a shaft supported by the inner race ring 10 and on which is suspended a gyroscope rotor, for example for high speed spinning about a bearing spin axis x—x. It will also be assumed and understood that the shaft is supported by at least another, preferably identical, ball bearing assembly (not shown) spaced laterally along the spin axis x—x. It will further be assumed that each ball bearing assembly is carefully lubricated such that during normal operation each ball of the assembly supports the rotor shaft load on an elastohydrodynamic (EHD) lubricant film so that the ball is essentially free to rotate (slip) about all of its axes as it supports the load. Although only recently coming into general use, the principles of EHD films are discussed in a book by Tedric A. Harris entitled "Rolling Bearing Analysis" and published by John Wiley and Sons, New York, 1966.

The ball 14 is axially preloaded between the inner and outer races 12, 13 so that it contacts the ball races along axis v—v at an angle $\beta$ relative to the radial axis y—y. The diametrically opposed preload forces therefore may be represented by the force arrows $F_{BALL}$ along axis v—v at the inner and outer contact points 15 and 16, respectively. It will be understood that at high bearing speeds an elastohydrodynamic film separates the ball 14 from the races 12 and 13 so that there is no actual metallic contact at these points. During operation, the ball 14 is restrained by the races 12, 13 to follow the ball path 17, as illustrated, at the angular velocity of the ball set, $\omega BALL\ SET$, dependent on the angular velocity of the inner race, $\omega INNER\ RACE$, about axis x—x. If the ball bearing were not of the preloaded, angular contact type (i.e., $\beta=0$) the angular velocity of each of the balls would be about an axis x'—x' parallel with the angular velocity vector of the ball set about axis x—x and no gyroscopic moments would be produced. However, since the effective diametrically opposed contact points 15, 16 and disposed are at the angle $\beta$ relative to the radial axis y—y, the ball tends to spin about an axis z—z orthogonal to an axis defined by contact points 15, 16 and disposed at an angle with respect to axis x'—x' and therefore develops momentum about the axis z—z that is not parallel to the ball's mass center spin axis x'—x'. It is assumed, in this description, that both radial and axial centrifugal forces are negligible to simplify the discussion. In practice the radial centrifugal force is not zero and will modify the effective ball spin axis z—z slightly. The basic concept, however, is not changed.

Since each of the balls has mass and is spinning about a spin axis, it is in effect a small gyroscope and possesses the inherent characteristics of a gyroscope, including precession. Thus, in spinning about the axis z—z which is not parallel with the axis x'—x', the illustrated gyroscopic moment $M_G$ along ball axis u—u normal to the ball's spin axis z—z is developed. This moment may result in a precession or creep of the ball 14 about its axis u—u, illustrated by a broken arrow, if the EHD lubricant film is adequate. The magnitude of this gyrosopic moment, $M_G$, may be expressed approximately by $$M_G = 0.05\rho(d_B)^5 \omega_{BALL\ SET} \sin \beta(\omega_{BALL} - \omega_{BALL\ SET} \cos \beta) \quad (1)$$

where
 $d_B$ = Ball Diameter
 $\rho$ = Ball Material Density
 $\omega_{BALL\ SET}$ = Angular velocity of the ball set about axis x—x
 $\omega_{BALL}$ = Angular velocity of the ball about axis z—z.

If the ball is free to creep due to a sufficient EHD lubricant film and gyroscopic moment, the ball will continuously present different diameters between its effective contact points 15 and 16 with the bearing races. As discussed above, the ball 14, like all of the balls of the ball set, is not perfectly spherical, and variations in preload and torque inherently result. Also, since the angle $\beta$ is normally relatively small, the gyroscopic moment is small and the resulting creep and periodicity is relatively slow so that the torque variation is likewise long term. For one particular spin bearing, the torque variation period was well over an hour, which produced a corresponding long term drift of the gyro in which it was incorporated.

In accordance with the teachings of the present invention this long term preload and torque variation is substantially eliminated by so configuring each ball of the ball set that the gyroscopic precession of the ball is opposed and rendered ineffective. This is accomplished by configuring each ball so that it will inherently spin about the axis z—z, that is, by configuring the ball such that its mass inertia about any nonspin axis is less that its mass inertia about its normal desired spin axis (z—z).

Figure 3:
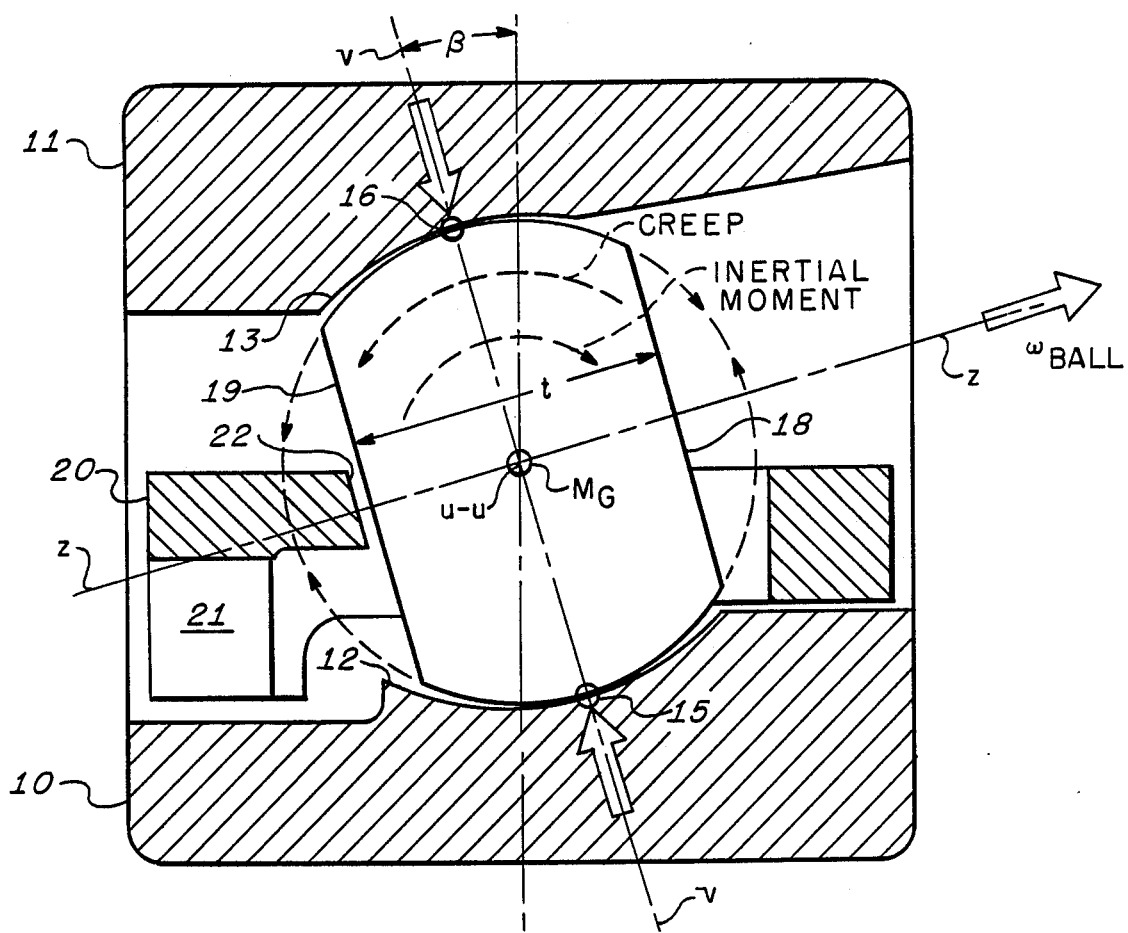
FIGS. 3 and 5 are cross sections through a ball bearing configured in accordance with two preferred embodiments of the present invention showing features of the ball restraining cage.

One embodiment of the present invention by which this inherent alignment will occur is illustrated in FIG. 3. As illustrated, each ball is configured so that its mass inertia about its axis z—z is greater than about any other of its axes, this configuration being achieved, for example by grinding diametrically opposed planar surface 18, 19 on each of the balls; i.e., by equally truncating opposed surfaces on a given diameter thereof. The thickness t determines the ball's moment of inertia about the axes z—z and v—v, that about axis z—z being greater. A restoring moment opposing the creep will be developed about axis u—u which increases as the ball precesses about that axis. When this restoring moment is equal to the gyroscopic moment, the precession will cease and the balls will spin with the axis of symmetry slightly misaligned from the ball spin axis z—z and stabilized whereby only one annular surface of each ball will present itself to the contact points 15 and 16 of the races, resulting in essentially zero variation in load torque.

Figures 4, 7:
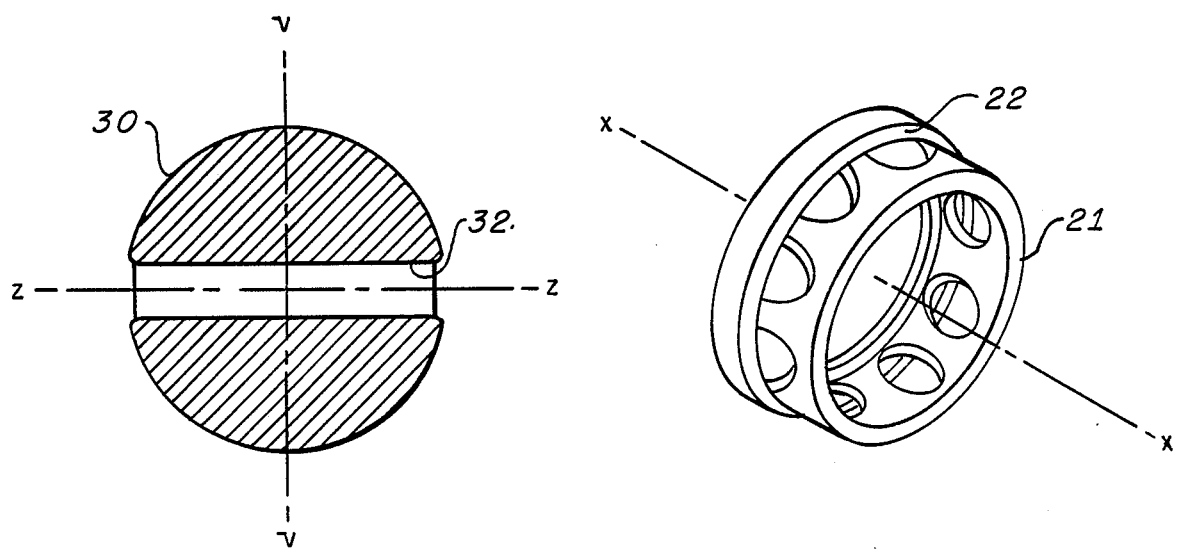
FIGS. 4 and 6 are drawings of single balls of ball bearings configured to show details of the ball structure for obtaining a non-uniform mass inertia distribution.
FIG. 7 is an isometric view of a ball retaining cage as used in FIG. 3.

When the bearing of the present invention is not operating during the time it is being brought up to a speed at which the EHD film is formed, means may be provided to prevent the ball's annular contact surface from becoming greatly misaligned with the raceways. This may be accomplished as illustrated in FIG. 3 by providing a low speed limit stop 20 on the ball retaining cage 21. This stop is configured to present a surface 22 which is parallel with the surface of the ball flat 19 and close enough at speeds lower than operational to prevent the ball from presenting a nonspherical surface to the raceway contact points 15 and 16 and yet far enough away as to allow for gyroscopic precession and the attendant advance of the ball flat 19 while maintaining the flat ball surface nearly normal to the ball spin axis z—z. As shown in FIG. 7, the ball retaining cage rotates about an axis x—x and is provided with a plurality of circular apertures for receiving and retaining the balls. The surface 22 is comprised of a radially extended ridge which acts in cooperation with a single planar surface 19 for controlling the relative angular position of the ball for rotation. It should be noted, here, that the ball flat 19 will rotate with respect to the cage flat 22 after the ball has precessed to an axis of equilibrium even though the gyrosocpic moment, $M_G$, is essentially constant.

Figure 5:
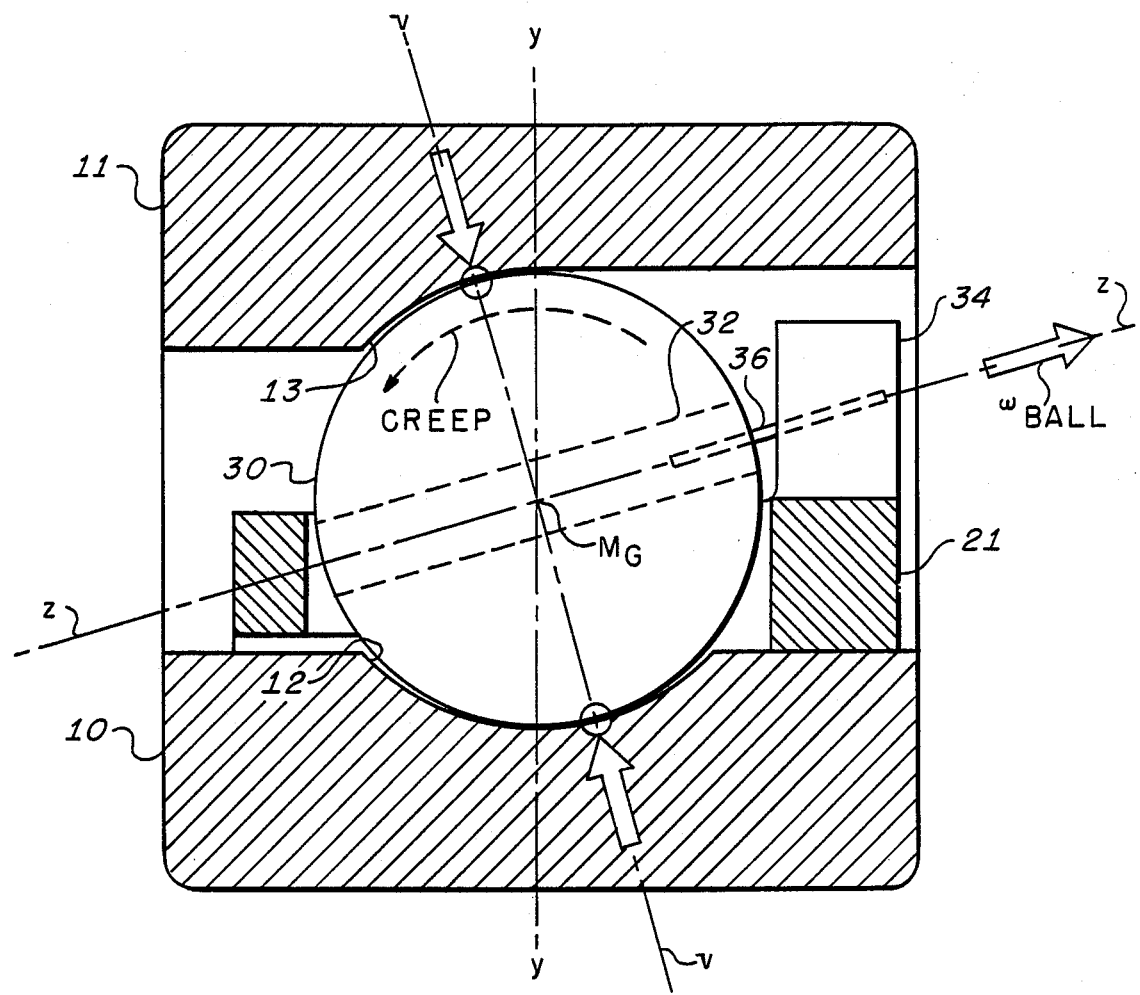

Other ball configurations for accomplishing the above purposes may also be clear from the above concepts. One such alternative configuration is illustrated in FIG. 4 in cross section wherein the mass inertia of the ball 30 about the spin axis z—z is made larger than that about axis v—v by drilling a hole 32 of the required size through a diameter of the ball. FIG. 5 shows the means by which the ball illustrated in FIG. 4 may be constrained to maintain the hole 32 nearly aligned with the desired spin axis z—z during operation of the bearing at speeds below the design speed. An extension flange 34 on cage 21 mounts a retaining pin 36 which provides the required restraint of the ball 30 in hole 32 with the same design guidelines as discussed previously.

Figure 6:
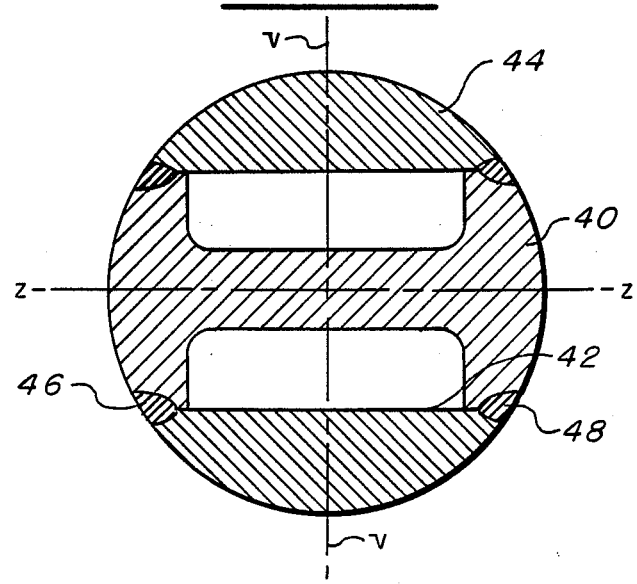

As shown in FIG. 6, another alternative would be to construct the ball with a high mass outer annular rim portion 44 and a low mass inner portion 40. A relatively low mass steel or other insert 40 is pressed into a cylindrical hole 52 bored in a relatively high mass ball 44 and secured by weldments 46 and 48. The ball may then be finish ground and lapped to size such as is used in conventional (solid) ball fabrication. These latter configurations may eliminate the need for the cage stop and retaining pin structures of the ball cage.

Using a ball of type 52100 chrome alloy bearing steel with a 0.1875 nominal diameter, having a linear dimension of 0.0938 inches across flats at a skew angle relative to the ball's spin axis of 45° the peak restoring torque would be about $7 \times 10^{-4}$ in-lb. Increasing the flat dimension to 0.125 inches provides about $4.5 \times 10^{-4}$ in-lb of torque. These data were calculated with a modified type 101H bearing operating at 3000 rev/min inner ring speed.

For the drilled ball of FIG. 4 using a 0.1875 diameter ball of 51200 alloy, a bore 0f 0.032 diameter provide useful results in the type 101H bearing. Note that a useful configuration may also be obtained by varying the depth of the bore, as well as the bore diameter.

The ball structure of FIG. 3 may be fabricated by first capturing the ball group on a magnetic plate which contains a set of holes smaller then the ball diameter in which the balls may be nested and grinding a flat on the exposed surface of each ball. A second operation would involve rotating the balls 180 degrees on the magnetic plate (but without the nesting holes) and grinding the second set of flats. The holes in the balls of FIG. 4 can be provided by a spark discharge, or similar process, wherein an electrode shaped like a cylindrical rod of a diameter slightly smaller than the desired hole size is attached to an oscillating arbor and the ball is nested in a suitable chuck. A voltage potential is developed between the electrode and the ball, with the ball submerged in a suitable coolant fluid, and the hole is developed by bringing the electrode into, and out of, mechanical and electrical contact with the ball such that the arcing developed when the contact is broken gradually removes material from the ball. This is an established process known by the trade as "spark discharge" machining.

While the invention has been described in its preferred embodiments, it is to be understood that the words which have been used are words of description rather than limitation and that changes may be made within the purview of the appended claims without departing from the true scope and spirit of the invention in its broader aspects.

I claim:

1. In a constant torque ball bearing assembly of the type having an outer bearing ring including an outer bearing race, an inner bearing ring including an inner bearing race, said rings spaced apart and concentricallly disposed on a bearing axis, and a plurality of spaced balls between and in rolling contact with said races, opposing contact surfaces of each of said balls defining an axis of rotation orthogonal thereto, each ball being configured to provide a mass inertia about its respective rotation axis that is greater than that about any other of its axes, said ball configuration comprising first and second planar surfaces, equally truncated on opposite sides of said ball along a common diameter,for providing, in operation, an inertial restoring moment thereby to maintain each of said balls in stable rotation substantially about a preferred rotation axis, the improvement comprising:

ball retaining cage means between said rings, said cage means being generally cylindrical and including a plurality of circular apertures for receiving ones of said balls, having a radially extending ridge acting in cooperation with only one of said first or second planar surfaces of each of said balls for controlling the relative angular positions of said balls for rotation.

2. In a constant torque ball bearing assembly of the type having an outer bearing ring including an outer bearing race, an inner bearing ring including an inner bearing race, said rings spaced apart and concentrically disposed on bearing axis, and a plurality of spaced balls between and in contact with said races, opposing contact surface of each of said balls defining an axis of rotation orthogonal thereto, each ball being configured to provide a mass inertia bout its respective rotation axis that is greater than that about any other of its axes for producing, in operation, an inertial restoring moment thereby to maintain each of said balls in stable rotation substantially about a preferred rotation axis, the improvement wherein:

said balls are in essentially free rolling contact with said races and said ball configuration comprises a cylindrical bore along a diameter thereof, in operation said diamter coinciding with said preferred axis of rotation, and further comprising a generally cylindrical ball retaining cage between said rings, said cage having a plurality of pins angularly disposed with respect to said bearing axis, ones of said pins aligned to engage ones of said cylindrical bore, for controlling the relative angular positions of said balls along a desired spin axis thereof.

3. In a constant torque ball bearing assembly of the type having an outer bearing ring including an outer bearing race, an inner bearing ring including an inner bearing race, said rings spaced apart and concentrically disposed on a bearing axis, and a plurality of spaced balls between and in essentially free rolling contact with said races, opposing contact surfaces of each of said balls defining an axis or rotation orthogonal thereto, each ball being configured to provide a mass inertia about its respective rotation axis that is greater than that about any other of its axes for producing, in operation, an inertial restoring moment thereby to maintain each of said balls in stable rotation substantially about a preferred rotation axis, the improvement wherein:

said ball configuration comprises two materials of different mass densities comprised of solid matter, one of said materials having a greater density defining at least a portion of an outer surface of said ball, and the other of said materials having a lesser density than said first mentioned material and defining a web-shaped core of said ball along said axis of rotation and a further portion of said outer surface integrally joined with said first mentioned material, in operation said surface of said higher density material defining said opposing contact surfaces.

* * * * *